June 14, 1938.   I. C. MATTHEWS   2,120,708
TIP FOR SOLDERING IRONS AND THE LIKE
Filed Feb. 6, 1935
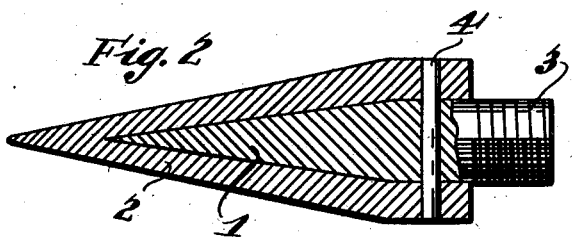
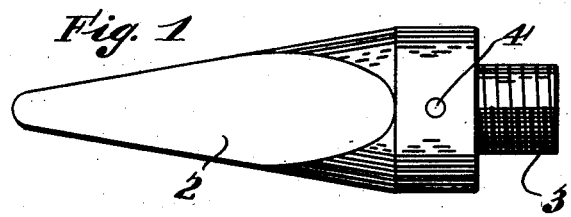
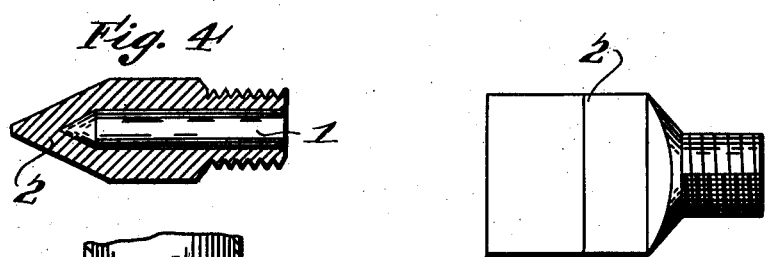
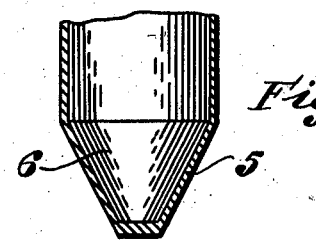
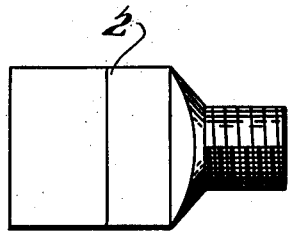
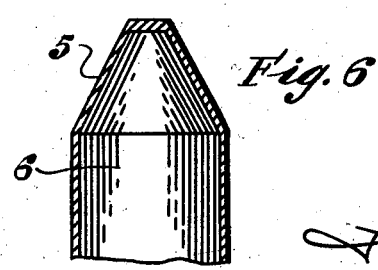
INVENTOR
Irving C. Matthews
BY
Frank Keifer
ATTORNEY Patented June 14, 1938

2,120,708

UNITED STATES PATENT OFFICE 2,120,708

TIP FOR SOLDERING IRONS AND THE LIKE

Irving C. Matthews, Rochester, N. Y.

Application February 6, 1935, Serial No. 5,252

1 Claim. (Cl. 113—105)

The object of this invention is to provide a new and improved tip for soldering irons which can also be used for spot welding by electricity and for other purposes.

Another object of the invention is to make the cover of the tip of an alloy that does not easily oxidize and is resistant to certain corrosion and, therefore, does not need frequent cleaning, as does the ordinary soldering iron and the tips for electric welding.

Another object of the invention is to make the tip of an alloy of nickel, chromium, and iron, or any two of these elements, with or without other elements that have a high melting temperature.

These and other objects of my invention will be illustrated in the drawing, described in the specification, and pointed out in the claim at the end thereof.

In the drawing:

Figure 1 is a side elevation of my improved tip.

Figure 2 is a longitudinal section of the tip shown in Figure 1.

Figure 3 is a modified form of the tip.

Figure 4 is a longitudinal section through the tip shown in Figure 3.

Figures 5 and 6 show tips used for spot welding with electricity, made in accordance with my invention.

It is well known that the tips for soldering irons and tips for electric welding apparatus are made of copper, because of the cheapness of the metal and its high heat and electric conductivity. It is also true that copper tips, when used for soldering, must be cleaned and tinned from time to time because the tip oxidizes when used in soldering and this interferes with its efficiency in soldering. The cleaning of the tip takes time that otherwise might be used in production, and wears away the tip itself.

This is also true in spot welding, where the copper oxidizes and the oxide forms a high resistance at a point where it is not wanted, and the oxide must be removed from the copper tip from time to time to get more efficient spot welding.

To overcome these objections I have invented a tip which I will now described. The tip comprises a core of copper, indicated by the reference numeral 1. This copper core is covered with a jacket 2 made of an alloy of elements having a high melting temperature and good heat and electric conductivity and good capacity for heat.

For this purpose I prefer to use an alloy composed of nickel, iron and chromium, or any two of these elements, either with or without other suitable elements, the proportions preferably being substantially as follows:

|  | Percent |
|---|---|
| Nickel | 50 |
| Iron | 34.65 |
| Chromium | 12 |
| Manganese | 1.50 |
| Silicon | 1.25 |
| Carbon | 0.60 |

It will be understood that this formula may be varied from by omitting the last three elements, or omitting any one of the first three elements.

It will also be understood that the amount of nickel and chromium may be varied over wide limits, and still give good results, as outlined above.

It will also be understood that the outside jacket may be made first, preferably in cast form, and ground and polished, and the copper may then be melted and poured into the jacket, or the copper may be machined and pressed in place, and in either case the stem 3 may be threaded to fit any standard soldering iron. The two portions may then be fastened together by the pin 4. The jacket may be made as thin as is practical to keep down the cost.

A soldering iron made in this way may be electrically heated or heated with charcoal or gas.

In Figures 1 and 2 I have shown a tip made with an oval end, and in Figures 3 and 4 I have shown a tip made with a blunt knife edge.

In Figures 5 and 6 I have shown a jacket 5 and a copper core 6 in the tips that are adapted to be used in a spot welding apparatus. The jacket will be made of the same alloy as will be used in making the soldering tips.

A tip made in this way oxidizes very slowly, if it oxidizes at all, and need be cleaned only at long intervals, as compared with the ordinary copper tips which must be cleaned every day or several times a day. Tips of this sort do not warp, check, or crack, or scale at high temperatures; as copper tips frequently do. Tips of this sort are cleaned as easily as the copper tips heretofore used, and because they must be cleaned much less frequently, they can be used with a great saving in labor and with a corresponding less waste of time.

I claim:

A tip for a soldering iron and the like, comprising a copper core, and a jacket made of the following in the following proportions, or thereabouts: nickel 50%, iron 34.65%, chromium 12%, manganese 1.50%, silicon 1.25%, carbon 0.60%.

IRVING C. MATTHEWS.